United States Patent [19]

Burmeister et al.

[11] Patent Number: 5,498,590
[45] Date of Patent: Mar. 12, 1996

[54] PROCESS FOR UNIFORM AND REPRODUCIBLE SHELL IMPREGNATION OF FIXED BED CATALYST SUPPORTS IN THE FORM OF LOOSE PARTICLES

[75] Inventors: Roland Burmeister, Hanau; Klaus Deller, Hainburg, both of Germany; Bertrand Despeyroux, Fourqueux, France

[73] Assignee: Degussa Aktiengesellschaft, Frankfurt am Main, Germany

[21] Appl. No.: 157,233

[22] Filed: Nov. 24, 1993

[30] Foreign Application Priority Data

Nov. 27, 1992 [DE] Germany .................. 42 39 876.2

[51] Int. Cl.$^6$ ................................. B01J 37/02
[52] U.S. Cl. ................ 502/439; 502/333; 502/334; 502/335
[58] Field of Search ..................... 502/439, 333, 502/334, 335

[56] References Cited

U.S. PATENT DOCUMENTS

| | | | |
|---|---|---|---|
| 4,009,125 | 2/1977 | Geierhaas | 502/8 |
| 4,255,253 | 3/1981 | Herrington | 208/216 |
| 4,255,285 | 3/1981 | Engelbach et al. | 502/343 |
| 4,472,527 | 9/1984 | Otake et al. | 502/210 |

FOREIGN PATENT DOCUMENTS

| | | |
|---|---|---|
| 0017000 | 10/1980 | European Pat. Off. . |
| 0068192 | 1/1983 | European Pat. Off. . |
| 0294775 | 12/1988 | European Pat. Off. . |
| 899648 | 12/1953 | Germany . |
| 2531770 | 1/1977 | Germany . |
| 1921467 | 11/1978 | Germany . |
| 3912504 | 10/1990 | Germany . |

*Primary Examiner*—Anthony McFarlane
*Attorney, Agent, or Firm*—Beveridge, DeGrandi, Weilacher & Young

[57] ABSTRACT

A process for uniform and reproducible impregnation of fixed bed catalyst supports in the form of loose particles with a desired shell volume, by applying atomized impregnating solutions of precursors of the catalytically active components onto the heap of catalyst supports circulated in a tank. By suitable selection of the spraying parameters, in particular the droplet size range, the quantity of solvent and the quantity of impregnating solution sprayed per rotation of the tank, the catalyst supports may be provided with shells with an excellent degree of uniformity.

7 Claims, 4 Drawing Sheets

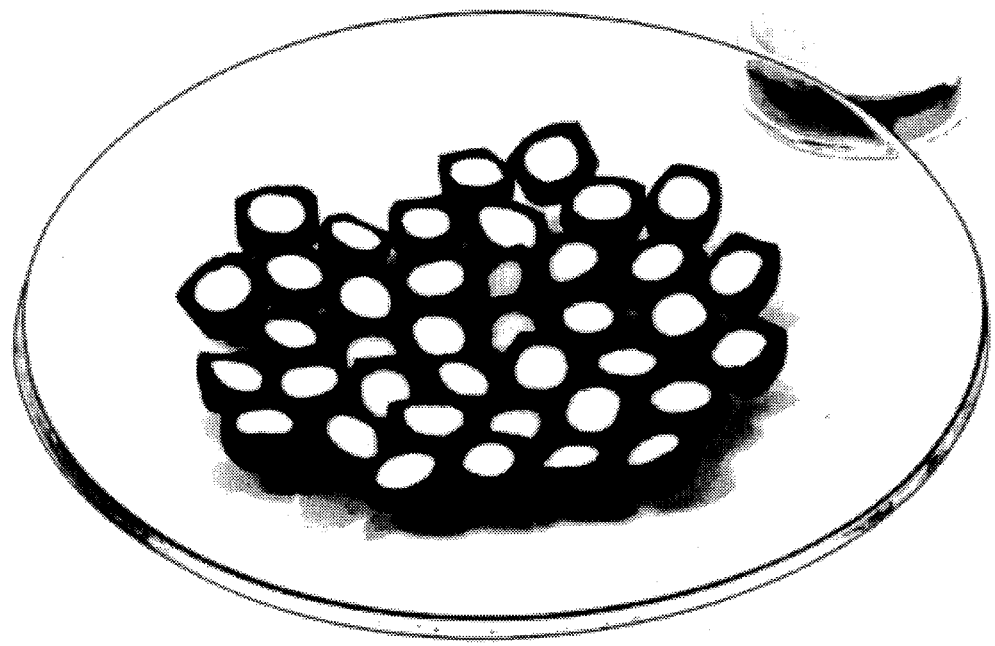
FIG. IA
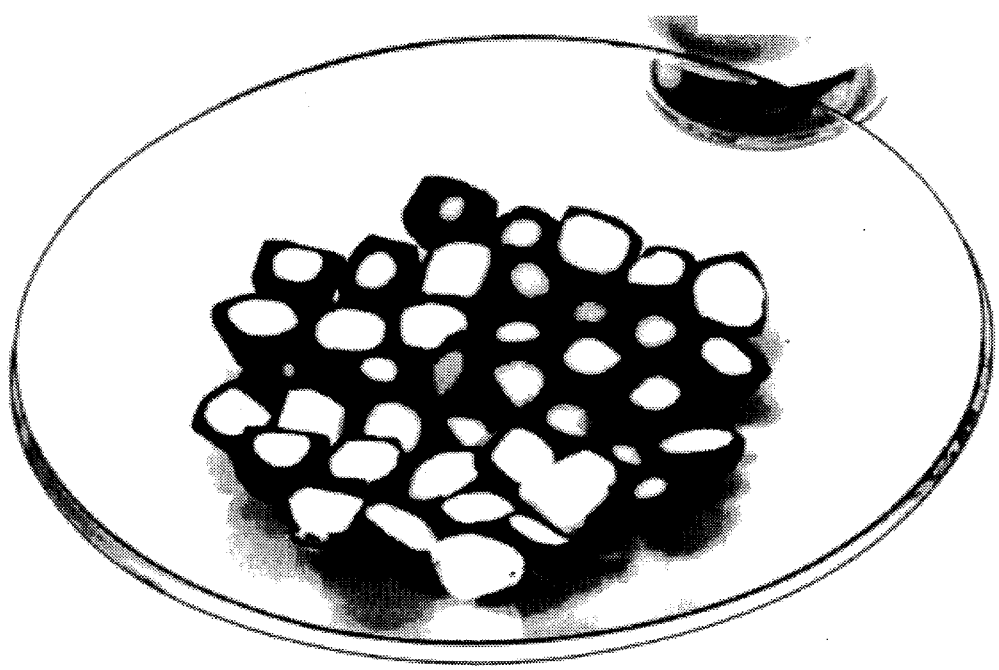
FIG. IB

PROCESS FOR UNIFORM AND REPRODUCIBLE SHELL IMPREGNATION OF FIXED BED CATALYST SUPPORTS IN THE FORM OF LOOSE PARTICLES

INTRODUCTION AND BACKGROUND

The present invention relates to a process and apparatus for uniform and reproducible impregnation of fixed bed catalyst supports in the form of loose particles with a desired shell volume, by applying atomized impregnating solutions of precursors of the catalytically active components onto the catalyst supports that are circulated in a tank.

Particulate catalysts are used for various catalytic processes. Catalyst supports in the form of extruded strands, granulates or pellets, are used in this case. Their geometric dimensions are in the range of 1 to 10 mm. In order to absorb the catalytically active components, they have a high pore volume—generally 0.5 to 2 ml/g—and a large specific surface (BET surface area determined by nitrogen adsorption according to DIN 66132). Depending on the catalytic process, homogeneous, ring-shaped or shell-like distribution profiles of the catalytically active components are formed through the cross-section of the catalyst support.

Catalysts impregnated with ring-shaped or shell-like distribution profiles are required for selective processes, in which prolonged contact of the reactants inside the support in the presence of the catalyst would lead to undesirable secondary reactions. A typical example of this is vinyl acetate synthesis.

Oxidic materials with a high surface area such as, for example, silicon oxide, aluminum oxides of various crystallographic forms, titanium oxide in anatase and/or rutile forms, zirconium oxide, zeolites as well as pellets containing carbon, either alone or in mixtures, are generally used as catalyst supports. These and other inorganic oxide substances known in the art can be used as the catalyst supports according to this invention. The lattice structure of the oxidic support materials can be stabilized to increase their temperature stability, for example, by doping with rare earths. Depending on the required catalytic function, these materials are impregnated with base metal components (e.g. nickel, copper or iron), noble metal components (e.g. platinum, palladium or rhodium), or combinations of these components. Precursors of these active components in the form of chlorides or nitrates are used for this purpose as known in the art.

Flooding methods, the incipient wetness method and spraying methods, with and without pre-coating, are known for the impregnation of catalyst supports. The suitability of these processes varies for the different distribution profiles.

The distribution profiles of the catalytically active components across the cross-section of the catalyst supports is dependent on the selected impregnation process. Moreover, the resulting diffusion profiles of the active components are influenced by chromatographic effects, i.e. they depend on the choice of support material as well as on the type of precursor of the catalytically active components in each case and the solvent used. Different diffusion profiles are produced in the same support material for one and the same catalytic component, depending on the precursor used (e.g. chlorides or nitrates). Moreover, as described in DE-PS 25 31 770, the diffusion profiles may be further influenced by pre-coating with various organic liquids.

Also essential for the finally adjusted profile is the time at which the catalytically active components are fixed by drying and calcination of the impregnated support or reduction of the precursors of the catalytic components. The shorter the interval between impregnation and fixing, the more likely the catalytic components will be fixed close to the surface in the form of a shell.

In the flooding process, the catalyst supports are immersed in an excess of impregnating solution, are removed from the solution after a certain period of impregnation, dried and then optionally activated. In this type of impregnation, the precursors of the catalyst diffuse deeply into the catalyst support. Depending on the duration of impregnation and on the combination of support-material/catalytic-precursor, a more or less uniform distribution of the catalytically active components results. For processes, in which the catalytic conversion occurs essentially on the surface of catalyst supports, this means that valuable catalytically active material is wasted deep in the catalyst supports. In addition, this may lead to undesirable secondary reactions, if, by diffusing into the catalyst supports, the reactants come into contact with the catalytically active components for a long period of time before they diffuse out of the supports once more.

The quantity of impregnating solution absorbed by an individual support particle in the flooding process depends on the individual absorption capacity of each support particle. Since the absorption capacity of the support particles fluctuates from particle to particle, even when the support particles are mass-produced, the support particles, as a consequence, are laden with different quantities of catalytically active components.

In the incipient wetness process, the maximum absorption capacity of the catalyst supports with respect to the impregnating liquid is determined first. The soluble precursors of the catalyst components are then dissolved in a quantity of impregnating liquid, which corresponds to 80 to 95% of the absorption capacity of the given quantity of catalyst supports. The quantity of the dissolved catalyst components is matched to the desired loading of the given quantity of catalyst supports with the catalytically active components. The impregnating solution is dispersed as evenly as possible over the catalyst supports circulated in a coating tank. This procedure ensures that the catalyst supports are coated with the given quantity of active components. However, this is only averaged out over a large number of the supports. Loading of the individual support particles can, however, differ from particle to particle because of the difference in absorption capacity, as in the case of the flooding process.

In the case of spray impregnation, a specific quantity of impregnating solution is sprayed through single- or dual-material nozzles over the catalyst supports circulated in a tank. The spraying method is particularly suited to the production of catalysts on a larger scale. With the spraying method the catalyst supports may be impregnated equally well in batches or in a continuous process. However, it has not been possible hitherto to produce shell catalysts with a high degree of uniformity using this process. A lack of uniformity may also be observed in this process, in particular in the impregnation over the surface of an individual catalyst support.

The object of the invention is therefore to provide an improved spraying process, which enables the production of shell catalysts with a high degree of uniformity and desired shell volumes without pre-coating the support.

SUMMARY OF THE INVENTION

The above and other objects of the invention are achieved by a process for uniform and reproducible impregnation of fixed bed catalyst supports in the form of loose particles with a desired shell volume, by applying atomized impregnating solutions of precursors of the catalytically active components onto the catalyst supports circulated in a confined circulation zone, usually provided in the form of a suitable vessel or tank.

It is a feature of the process of the invention that the quantity of precursors of the catalytically active components necessary for the desired loading of the catalyst supports is dissolved in a volume of the solvent corresponding to 30 to 100% of the solvent absorption capacity provided by the desired shell volume. It is a further feature that on each rotation of the tank, 0.01 to 2% of this impregnating solution are atomized into droplets with an average diameter of 10 to 90 µm, preferably 10–30 µm, and are applied onto at least 10% of the surface of the catalyst particles without pressure and without support gas.

BRIEF DESCRIPTION OF THE DRAWINGS

The invention will be further understood with reference to the drawings, wherein:

FIG. 1a: shows cross-sections through Aerosil supports impregnated with palladium (Aerosil is a trademark of Degussa AG for pyrogenic SiO$_2$) according to Example 1;

FIG. 1b: shows cross-sections through Aerosil supports impregnated with palladium according to Comparative Example 1;

DETAILED DESCRIPTION OF INVENTION

Figure 2A:
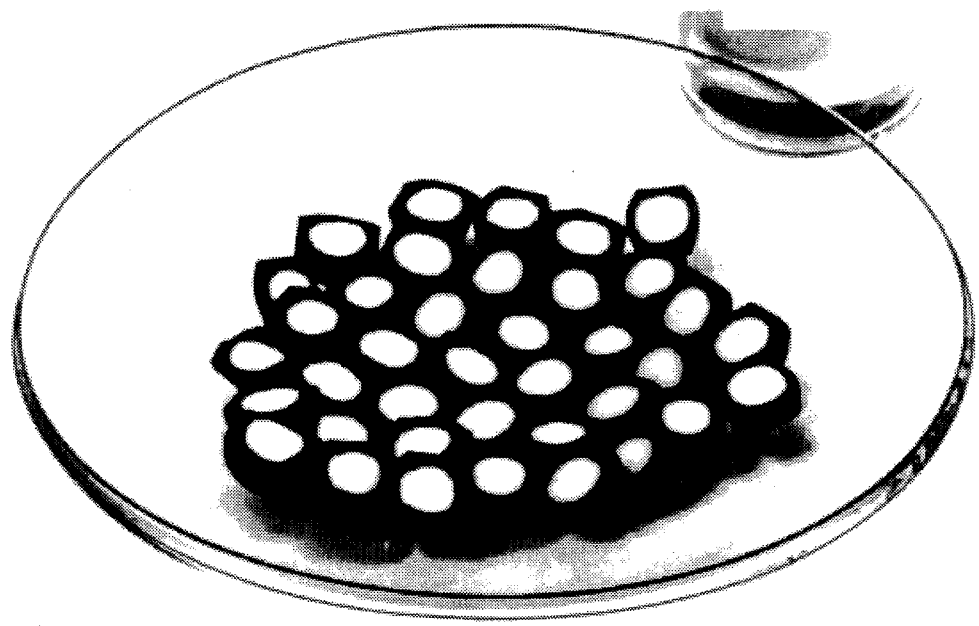
FIG. 2a: shows cross-sections through Aerosil supports impregnated with platinum according to Example 2.

With specific combinations of support materials, catalytic precursors and solvents, the catalytic components must be fixed directly after impregnation to prevent further diffusion. This may be achieved by drying and optionally by reduction of the catalytic components.

According to the invention, the shell thickness is determined by the volume of solvent which may be absorbed by the desired shell volume because of its porosity. This solvent absorption capacity is not generally identical to the pore volume of the support material. The pore volume is a combination of the volume of micro-, meso- and macropores. The micro- and mesopores are determined by measuring the N2 adsorption isotherms and evaluating them according to BET (DIN 66132). The macropores are determined by the mercury intrusion method.

The solvent absorption capacity, however, depends on the respective solvent/support material combination and must be determined separately. This is achieved in a simple way by putting the support material in a glass filled with solvent at room temperature to absorb solvent until no more air bubbles rise. The support material is then removed from the solvent, its surface dried with paper and it is then weighed. The quantity of absorbed solvent, and thus the sought solvent absorption capacity, are determined from the difference in weights before and after the absorption of solvent. Accordingly, this can easily be done for each support material selected.

In the case of tablets of pyrogenic silicon dioxide according to DE 39 12 504, the pore volume is approximately the same as the capacity of the tablets to absorb water.

The volume of solvent to be applied for setting the desired shell thickness is usually less than that corresponding to the solvent absorption capacity. The volume of solvent to be used according to the invention lies between 30 and 100% of the absorption capacity of the shell.

The cause of this lies in the already described chromatographic effects. The actual volume of solvent for setting a specific shell thickness must, therefore, be determined by initial tests for the corresponding combination of catalyst precursor/solvent/support material.

Formulas for calculating the percentage of shell volume $V_{Shell}$ related to the total volume $V_{total}$ of the catalyst supports are set forth below:

a) in the case of spherical catalyst supports $$\frac{V_{Shell}}{V_{total}} = \left[ 1 - \left( 1 - \frac{t}{r} \right)^3 \right] \times 100\%$$

where r is radius of sphere and t is thickness of shell b) in the case of cylindrical catalyst supports $$\frac{V_{Shell}}{V_{total}} = \left[ 1 - \left( 1 - \frac{t}{r} \right)^2 \left( 1 - 2\frac{t}{h} \right) \right] \times 100\%$$

where r is radius of cylinder; h is height of cylinder and t is thickness of shell.

Since the pore volume of the catalyst support material is 0.76 ml/g, 1 kg of the material will contain 760 ml of pore volume. Since the shell volume amounts to 50% of the total volume of the catalyst supports, the shell volume of 1 kg of catalyst supports is 380 ml of pore volume.

According to the invention, the impregnating solution is separated by suitable atomizers into droplets with average droplet diameters of 10 to 90 µm preferably 10–30 µm. The atomizers must ensure a constant narrow droplet size distribution, whereby at least 60% preferably 80%, of the entire volumetric flow should be atomized into droplets with diameters Which are no greater than double the average arithmetical droplet diameter.

This small droplet diameter and the narrow droplet size distribution cause the impregnation of a support to be made up of a large number of identical individual impregnations. This prevents non-uniform impregnation over the surface of an individual catalyst support, as is known from the prior art using larger droplet diameters with a broader droplet size distribution. At the same time, the volumetric flow of the impregnating liquid to be atomized is set so low that only about 0.01 to 2% of the entire impregnating solution is sprayed on each rotation of the impregnating tank. This measure ensures that over the entire impregnation period, the catalyst particles are circulated sufficiently frequently and each catalyst particle is covered with the same quantity of impregnating solution.

With the process according to the invention, defined shell catalysts may be produced even with material combinations (support material, precursors, solvents), with which this was not possible in previous processes because of an inadequate chromatographic effect.

A further essential point of the process according to the invention is the fact that the droplets are applied onto at least 10% of the surface of the heap of catalyst particles without pressure and without support gas.

Because of the pressureless atomization and the low mass of the liquid droplets, the use of a support gas—even with closed impregnating vessels—would lead to an uncontrolled discharge of impregnating solution through the required exhaust nozzles, and thus result in uncontrolled losses of catalytically active components.

The condition that at least 10% of the surface of the bulk material must be sprayed together with the set value for the volume sprayed for each rotation of the impregnating tank ensures that all the catalyst supports are uniformly coated with catalytic components.

Carrying out of the process according to the invention requires longer impregnating times than previously necessary for impregnation of catalyst supports. This disadvantage is, however, substantially compensated for by the excellent quality of the catalysts produced using this process. Moreover, this process also permits the production of shell catalysts for combinations of materials, which previously required complicated pre-coating processes (see DE-PS 25 31 770) to produce shells.

It is important for the process according to the invention that the individual measures are correctly matched to one another. This relates to the batch size, type of impregnating vessel (e.g. impregnating tank, biconical mixer), atomizer and the properties of the catalyst supports, catalytic precursors and solvents. However, this matching can be carried out by any person skilled in this art after some initial tests on the basis of the teaching of the invention.

The process according to the invention is equally well suited for impregnation with aqueous or organic solvents. When using readily volatile solvents, it may be advantageous if the impregnating process is carried out in a saturated atmosphere of the solvent in the temperature range of 30 to 10° C. below its boiling point. Because of their large surface area, the fine droplets of solvent tend towards a high evaporation rate and therefore undesirable spray drying would occur in the absence of a saturated atmosphere.

Ultrasonic nozzles have proved to be particularly suitable for atomizing the impregnating solutions into small droplets. They atomize in the desired diameter range with a narrow droplet size range without the assistance of a support gas and allow very fine regulation of the volumetric flow. Other spraying systems able to generate the required droplet spectrum without support gas supply and in association with good controllability of the volumetric flow are, of course, also suitable. Such nozzles are known in the art.

The invention relates further to a device for implementation of the above-described process as set forth below.

The device comprises a rotatable mixing vessel with rotational speed control to hold and circulate the support material provided in the form of loose particles, wherein the mixing vessel is arranged in a gastight, sealable casing or may itself have a gastight seal and is provided with one or several ultrasonic spray nozzles, the spraying angle and spacing of which may be adjusted relative to the surface of the circulating heap of catalyst particles . Moreover, the device comprises temperature sensors and temperature control circuits to control the temperature of the catalyst particles and the resulting saturated solvent atmosphere in a temperature range of between 10° and 250° C., as well as temperature controlled supply pipes for feeding the impregnating solutions to the ultrasonic spray nozzles and flow regulators to control the volumetric flow of the impregnating solution and sealable gas supply pipes for flushing gases.

As shown in FIG. 4, the apparatus of the present invention as carried out in a laboratory scale embodiment includes a gas tight casing 1 enclosing rotation zone as provided by a rotatable mixing vessel 2. Inside of the confined rotating zone the catalyst particles are heaped 3 and are subjected to circulating forces causing them to tumble about in the rotating vessel 2. Suitable device and control unit means 4 are provided connected up with the gastight casing 1 and mixing vessel 2. A gas tight seal 5 is provided to enclose the gastight casing 1. Ultrasonic spray nozzle means 6 are inside the casing 1 and connected to the source of impregnating solution located in vessel 1. The casing 1 is provided with a suitable heating means such as electrical heating wires 8.

A thermostatic unit 7 is connected to the casing 1 for temperature control and power supply. A temperature sensor 9 such as a thermocouple is present inside the casing 1. Supply tank 10 for the impregnating solution is jacketed or furnished with appropriate means for providing heating or cooling fluid such as closed circuit loop 16 and is controlled by temperature control 15 for circulating the heating or cooling fluid. The impregnating solution is fed to the spray nozzle 6 through temperature controlled supply line 11. An inlet 12 for flushing gas such as nitrogen is also provided as well as venting line 13 for exit of flushing gas. It should be noted that various means can be used to control temperature in the supply line 11, for the casing 1 and for the supply tank 10. Also the temperature control and circulating unit 15 could be replaced by an electrical heating circuit. For full scale production, various engineering considerations may dictate somewhat different arrangements of equipment.

Spraying Apparatus

The spraying apparatus comprises an impregnating tank 300 mm in diameter (9.5 l volume) in a double-walled casing. The casing can be fitted with water jacket or pipes for temperature control. It could also be fitted with electrical heating wires. The impregnating tank and casing are coated with suitable polymer, such as polytetrafluoroethylene, (Teflon®) for protection against corrosion. The impregnating tank can be rotated by a variable-speed motor at rotational speeds of between 5 and 150 $min^1$. A rotational speed of 22 $min^{-1}$ is used in the impregnations in the following examples. For thorough mixing of the catalyst supports, the rotational axis of the impregnating tank is inclined 65° relative to the vertical.

For spraying the impregnating solutions, a commercially available spray nozzle with ultrasonic atomization (frequency of the transducer: 100 KHz, flow rate: 0 to 2 l/h) is used without support gas. This spray nozzle generates a droplet spectrum with an average diameter of about 25 μm. 97% of the entire volumetric flow atomizes into droplets with diameters of less than double the average droplet diameter.

After the impregnating tank has been filled with the catalyst supports and the double-walled casing sealed, the apparatus is first flushed with nitrogen before the actual impregnation is commenced.

Example 1: Shell impregnation of a pyrogenic silica (AEROSIL®) support with palladium according to the invention.

1 kg of a fixed bed catalyst support composed of pyrogenic SiO2 (AEROSIL 200® from Degussa) with a pore volume of 0.76 ml/g and a specific surface of 176 $m^2$/g) was to be impregnated with palladium to a shell thickness of 0.6 mm. The catalyst supports were provided in the form of cylinders with rounded end surfaces (dimensions: 5.5 mm high, 6 mm in diameter). The selected impregnating solution was an aqueous palladium chloride solution.

The shell volume is calculated using the above numerical values from simple geometric calculations to about 50% of the total volume of the catalyst supports. The pore volume included in the shell volume of 1 kg of catalyst supports therefore amounts to 380 ml. 170 ml was determined in initial tests as the optimum quantity of solvent, corresponding to 45% of the shell volume. Therefore, for impregnating the catalyst supports with 1 wt. % palladium, 170 ml of an aqueous solution of palladium chloride containing 10 g palladium were produced.

The catalyst supports were impregnated in the above-described apparatus. The spraying time for the determined quantity of 170 ml palladium chloride solution amounted to 45 min. Only about 0.1% of the impregnating solution was sprayed on each rotation of the impregnating tank.

After impregnation, these catalyst precursors were dried in a moving bed for 2 h at 115° C. and reduced for 1 h in the $H_2/N_2$ flow (95% $N_2$/5% $H_2$) at 400° C.

FIG. 1a shows transverse micro-sections of the catalysts thus produced. The transverse micro-sections show a very regular palladium-containing shell with a thickness of 0.6 to 0.7 mm.

Comparative Example 1: Shell impregnation of an AEROSIL support with palladium according to the prior art Comparative Example 1 was carried out analogous to Example 1, however the palladium chloride solution was this time sprayed with a conventional pressure nozzle (polypropylene, hole diameter 0.8 mm). The overall spraying time amounted to 95 seconds.

FIG. 1b shows transverse micro-sections of the catalysts produced in this way. The thickness of the shells amounts to between 0 mm (i.e. free of noble metal) and 3 mm (i.e. uniformly impregnated catalyst supports).

Example 2: Shell impregnation of an AEROSIL support with platinum according to the invention Example 2 was carried out analogous to Example 1, but this time 170 ml of a platinum chloride solution with a platinum content of 10 g were sprayed. The spraying time amounted to 50 minutes.

FIG. 2a shows transverse micro-sections of the catalysts thus produced. The transverse micro-sections show a very regular platinum-containing shell with a thickness of 0.5 to 0.6 mm.

Comparative Example 2: Shell impregnation of an AEROSIL support with platinum according to the prior art Comparative Example 2 was carried out analogous to Example 2, but this time the platinum chloride solution was sprayed with a conventional pressure nozzle (polypropylene, hole diameter 0.8 mm). The overall spraying time amounted to 100 seconds.

Figure 2B:
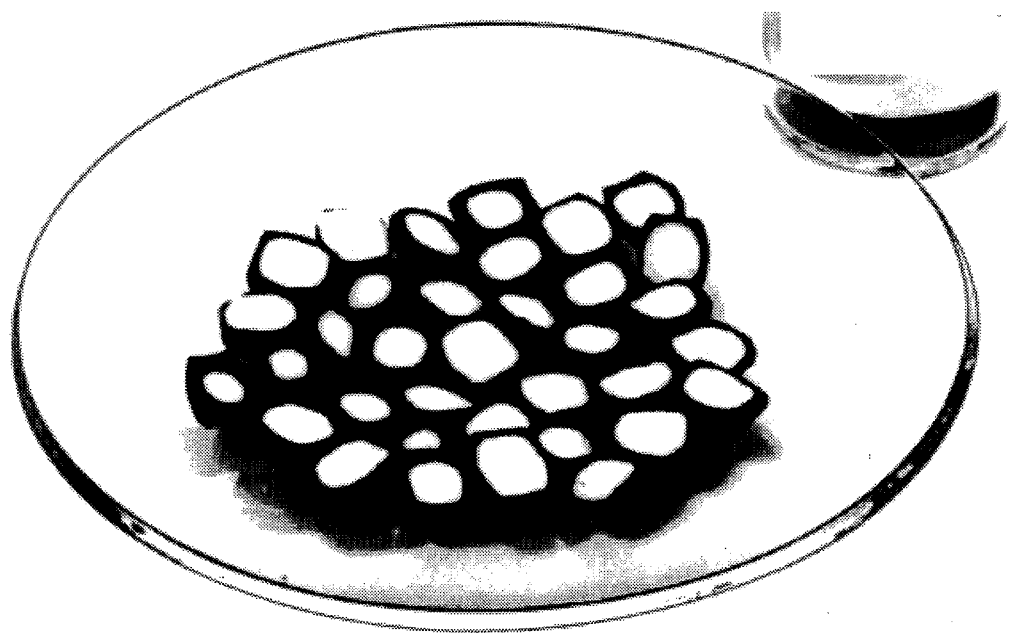
FIG. 2b: shows cross-sections through Aerosil supports impregnated with platinum according to Comparative Example 2.

FIG. 2b shows transverse micro-sections of the catalysts produced in this way. The thickness of the shells amounts to between 0 mm (i.e. free of noble metal) and 3 mm (homogeneously impregnated catalyst supports).

Example 3: Shell impregnation of an AEROSIL support with nickel according to the invention Example 3 was carried out analogous to Example 1, but this time 170 ml of a nickel chloride hexahydrate solution with a nickel content of 10 g were sprayed. The spraying time amounted to 48 minutes.

Figure 3A:
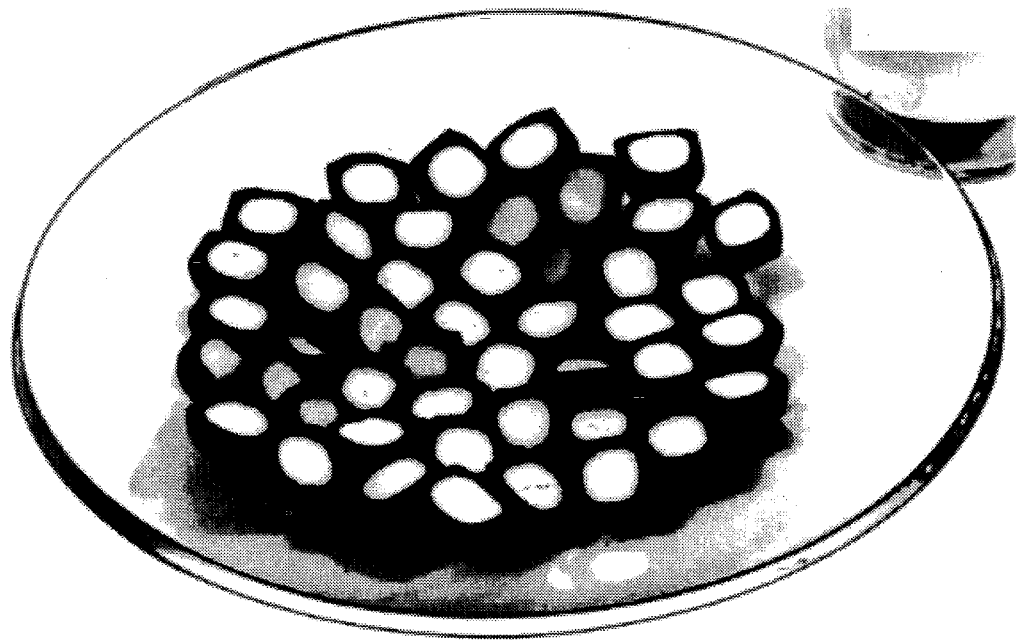
FIG. 3a: shows cross-sections through Aerosil supports impregnated with nickel according to Example 3.

FIG. 3a shows transverse micro-sections of the catalysts thus produced. The transverse micro-sections show a very regular nickel-containing shell with a thickness of 0.5 to 0.6 mm.

Comparative Example 3: Shell impregnation of an AEROSIL support with nickel according to the prior art Comparative Example 3 was carried out analogous to Example 3, but this time the nickel chloride hexahydrate solution was sprayed with a conventional pressure nozzle (polypropylene, hole diameter 0.8 mm). The overall spraying time amounted to 105 seconds.

Figure 3B:
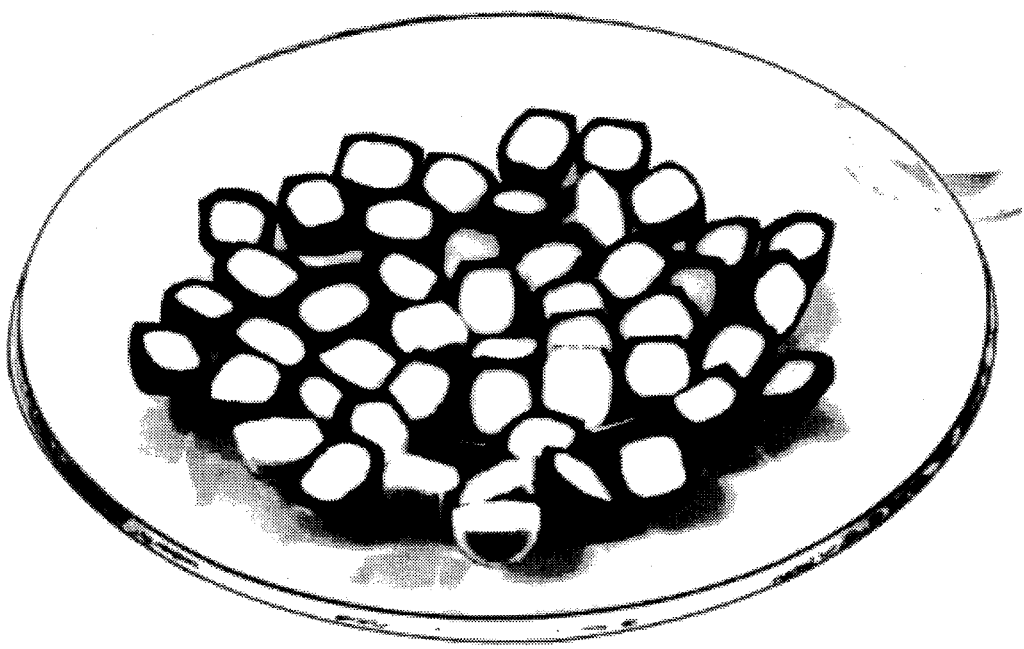
FIG. 3b: shows cross-sections through Aerosil supports impregnated with nickel according to Comparative Example 3; and, FIG. 4: shows a schematic diagram of apparatus used in accordance with the process of the invention.
Figure 4:
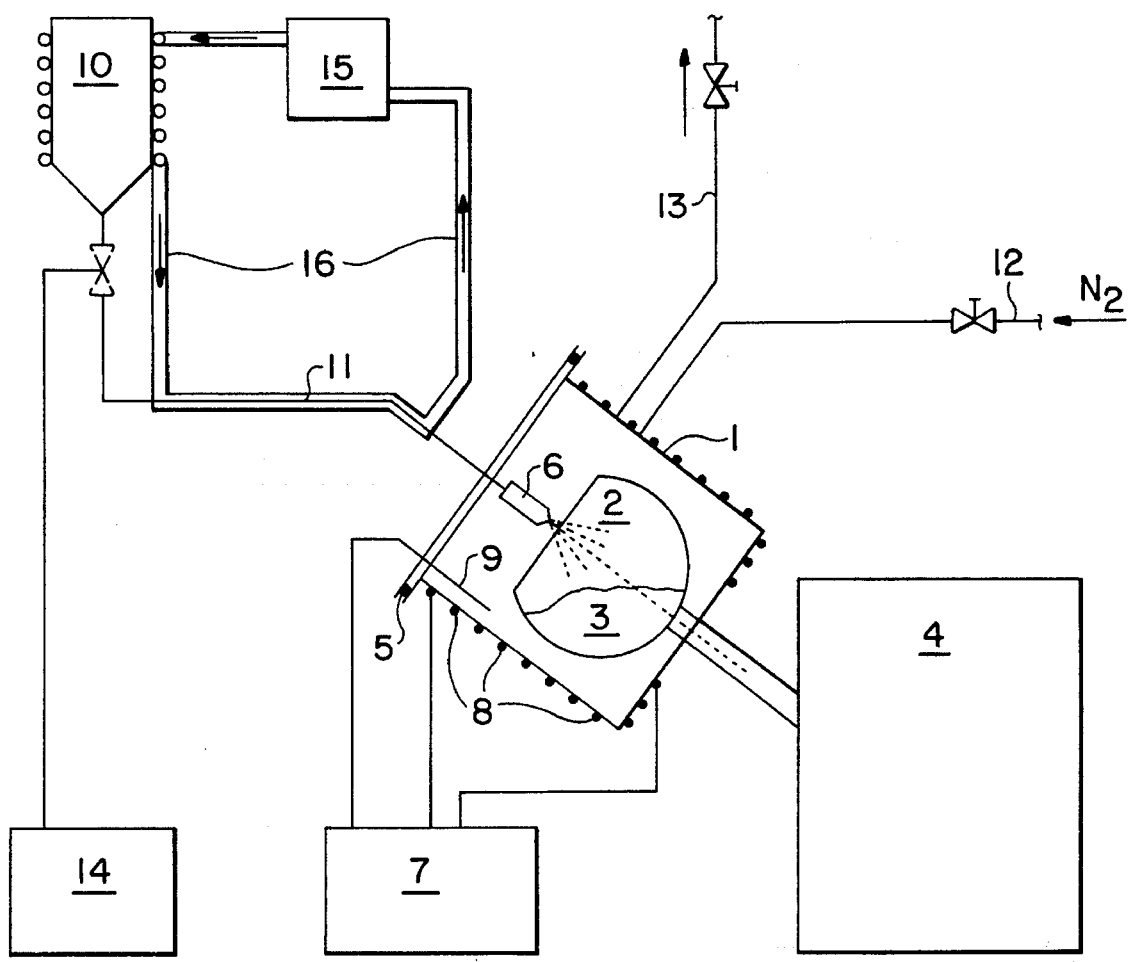

FIG. 3b shows transverse micro-sections of the catalysts produced in this way. The thickness of the shells amounts to between 0 mm (metal-free) and 3 mm (homogeneously impregnated catalyst supports).

As the described test examples show, the catalysts impregnated according to the invention have an extremely uniform noble metal shell type distribution reproducible from catalyst particle to catalyst particle, compared with the prior art. This concerns in particular the thickness of the shell impregnated with noble type in the finished catalyst.

Since the catalytic performance data such as activity, selectivity and service life of the catalyst are closely associated with the shell thickness, in the case of fixed bed catalysts, this means the quality of the produced catalysts is very uniform from particle to particle, but also from production batch to production batch. It can therefore be expected that a catalyst produced according to the invention may always be optimally matched with respect to the mentioned performance data to the chemical reaction in which it acts as a catalyst, and therefore the catalytically active material may be optimally utilized in the reaction.

Further variations and modifications of the foregoing will be apparent to those skilled in the art and are intended to be encompassed by the claims appended hereto.

German priority application P 42 39 876.2 is incorporated herein and relied on.

We claim:

1. A process for the uniform and reproducible impregnation of catalyst supports in the form of loose particles with a desired shell volume, consisting essentially of applying an atomized impregnating solution of a precursor of the catalytically active component in a solvent onto the circulating catalyst inorganic support in a circulation zone, the quantity of precursor of the catalytically active component necessary for the desired loading of the catalyst support is dissolved in a volume of said solvent corresponding to 30 to 100% of solvent absorption capacity provided by the desired shell; and on each circulation of the catalyst support, 0.01 to 2% of this impregnating solution is atomized into droplets with an average diameter of 10 to 90 μm and are applied onto at least 10% of the surface of the catalyst particles without pressure and without support gas wherein at least 60%, of the impregnating solution is atomized into droplets with diameters which are no greater than double the average droplet diameter and whereby the desired thickness of said shell is obtained.

2. The process according to claim 1, wherein said diameter is 10–30 μm.

3. The process according to claim 1 wherein at least 80% of the impregnating solution is atomized into droplets with diameter which are no greater than double the average.

4. The process according to claim 1 wherein the precursor of the catalytically active component is fixed onto the catalyst support by drying and optionally by reduction.

5. The process according to claim 1 wherein the impregnating solution is an aqueous or organic solution of the precursor of the catalytically active component.

6. The process according to claim 1 wherein the impregnation is carried out in a saturated atmosphere of the solvent.

7. The process according to claim 1, wherein the impregnating solution is atomized by means of an ultrasonic nozzle.

\* \* \* \* \*